(12) United States Patent
Woo

(10) Patent No.: US 12,261,480 B2
(45) Date of Patent: Mar. 25, 2025

(54) MOTOR

(71) Applicant: LG INNOTEK CO., LTD., Seoul (KR)

(72) Inventor: Shung Hun Woo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 319 days.

(21) Appl. No.: 17/618,319

(22) PCT Filed: Jun. 10, 2020

(86) PCT No.: PCT/KR2020/007474
§ 371 (c)(1),
(2) Date: Dec. 10, 2021

(87) PCT Pub. No.: WO2020/251244
PCT Pub. Date: Dec. 17, 2020

(65) Prior Publication Data
US 2022/0368176 A1    Nov. 17, 2022

(30) Foreign Application Priority Data

Jun. 11, 2019 (KR) ..................... 10-2019-0068764
Aug. 21, 2019 (KR) ..................... 10-2019-0102384

(51) Int. Cl.
*H02K 1/14* (2006.01)

(52) U.S. Cl.
CPC ......... *H02K 1/146* (2013.01); *H02K 2201/03* (2013.01); *H02K 2213/03* (2013.01)

(58) Field of Classification Search
CPC ...... H02K 21/16; H02K 29/03; H02K 1/2781; H02K 1/146; H02K 2213/03; H02K 2201/03

(Continued)

(56) References Cited

U.S. PATENT DOCUMENTS 5,331,245 A    7/1994 Burgbacher et al.
6,329,736 B1 * 12/2001 Bernauer ............... H02K 29/03
                                                       310/191

(Continued)

FOREIGN PATENT DOCUMENTS

EP    2 940 831 A1    11/2015
EP      3678281 A1     7/2020

(Continued)

OTHER PUBLICATIONS

European Communication pursuant to Article 94(3) EPC for European Application No. 20 823 639.8. dated Mar. 11, 2024.

*Primary Examiner* — Alex W Mok
(74) *Attorney, Agent, or Firm* — Birch, Stewart, Kolasch & Birch, LLP

(57) ABSTRACT

The present invention may provide a motor including a shaft, a rotor coupled to the shaft, and a stator disposed to correspond to the rotor, wherein the stator includes a yoke and a tooth protruding from the yoke, the tooth includes a first surface, a plurality of second surfaces, and a plurality of third surfaces which are opposite to the rotor, the second surface is disposed between the first surface and the third surfaces to have predetermined gaps therebetween in a radial direction from the shaft, and a shortest distance from the shaft to the first surface is shorter than a shortest distance from the shaft to the third surface.

12 Claims, 9 Drawing Sheets

(58) Field of Classification Search
USPC .......................................................... 310/179
See application file for complete search history.

(56) References Cited

U.S. PATENT DOCUMENTS

| | | | | |
|---|---|---|---|---|
| 6,744,171 | B1 * | 6/2004 | Kolomeitsev | H02K 1/146 |
| | | | | 310/254.1 |
| 6,984,909 | B2 * | 1/2006 | Kadoya | H02K 29/03 |
| | | | | 310/185 |
| 7,550,891 | B2 * | 6/2009 | Kim | H02K 21/16 |
| | | | | 310/156.56 |
| 8,324,779 | B2 * | 12/2012 | Kato | H02K 1/2746 |
| | | | | 310/156.57 |
| 10,186,916 | B2 | 1/2019 | Asakura et al. | |
| 2006/0279158 | A1 | 12/2006 | Kim | |
| 2007/0018523 | A1 | 1/2007 | Ionel et al. | |
| 2011/0018384 | A1 | 1/2011 | Kenjo et al. | |
| 2014/0042853 | A1 | 2/2014 | Shimizu et al. | |
| 2017/0288517 | A1 | 10/2017 | Ikeno et al. | |

FOREIGN PATENT DOCUMENTS

| | | |
|---|---|---|
| JP | 2005-245146 A | 9/2005 |
| JP | 2007-209186 A | 8/2007 |
| JP | 2016-063728 A | 4/2016 |
| JP | 5937701 B2 | 6/2016 |
| KR | 10-2019-0023243 A | 3/2019 |
| WO | WO 2009-119734 A1 | 10/2009 |

\* cited by examiner

[FIG. 1]
1
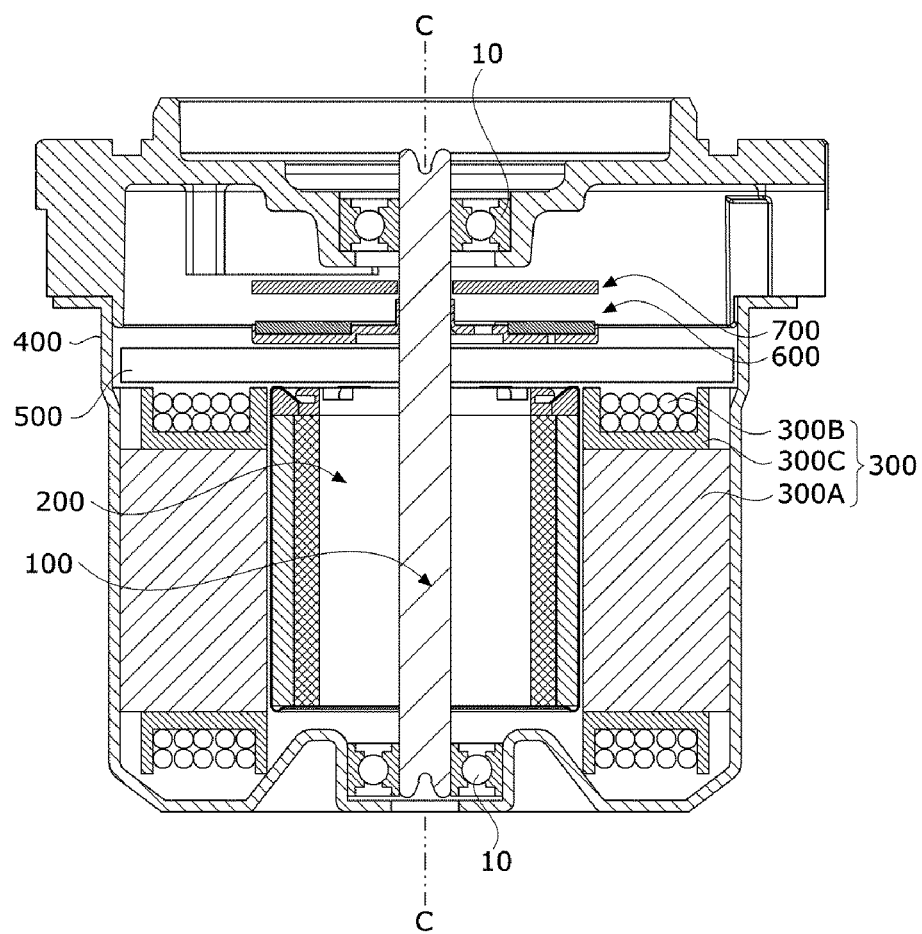

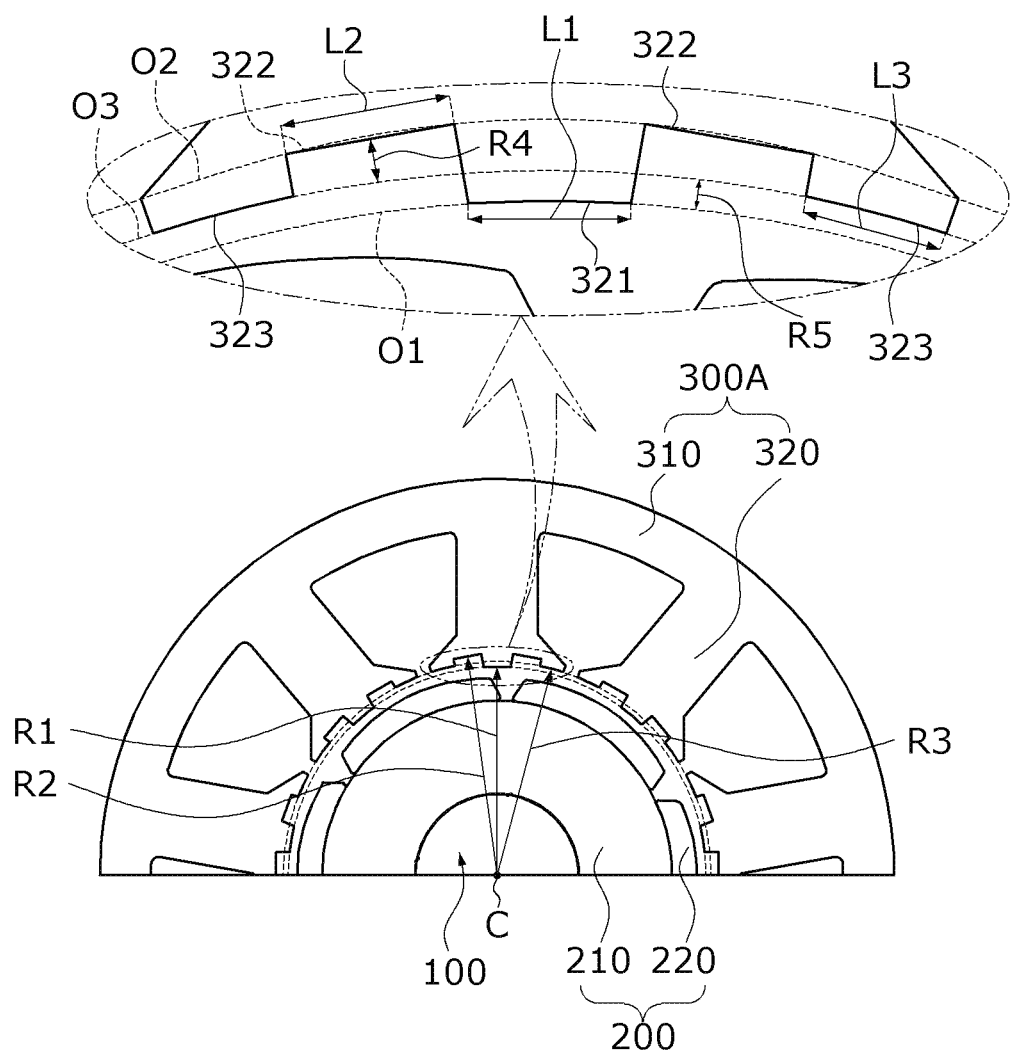
[FIG. 2]

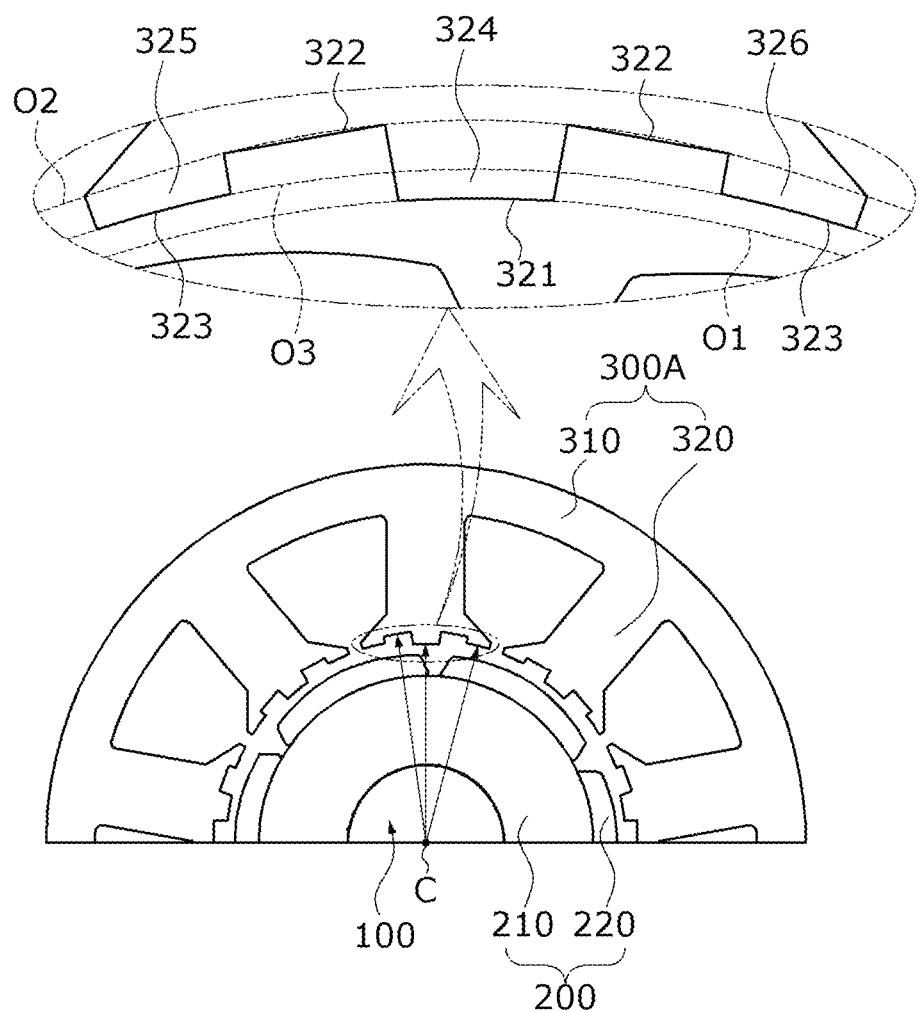
[FIG. 3]

[FIG. 4]
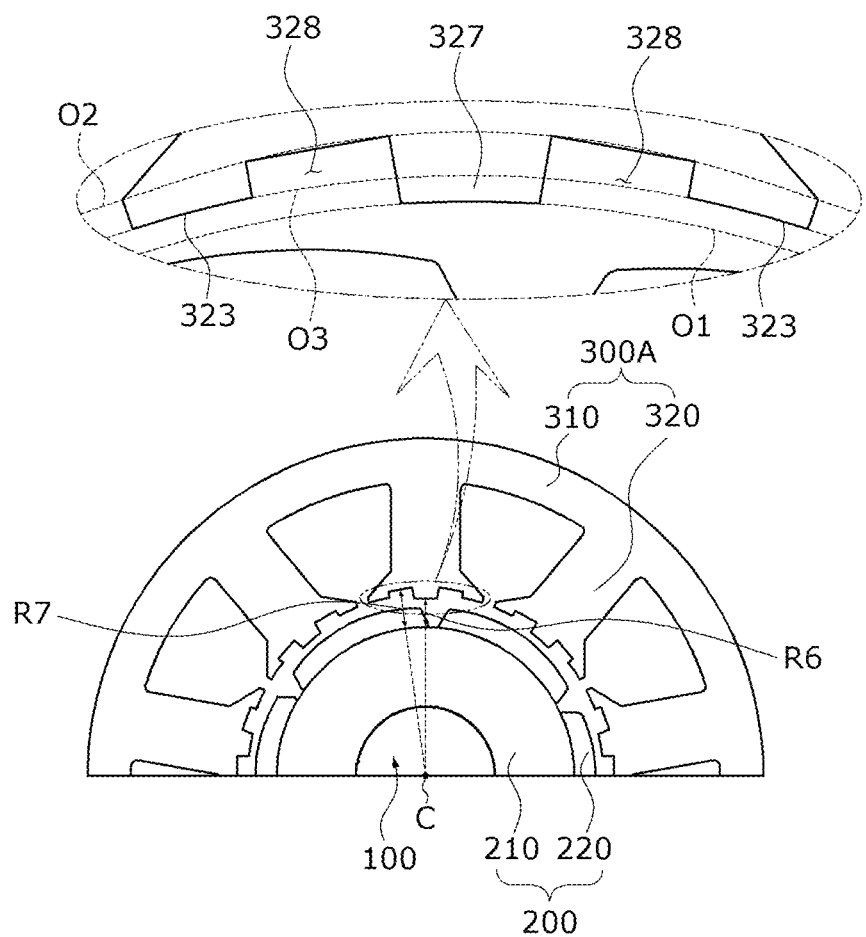

[FIG. 5]
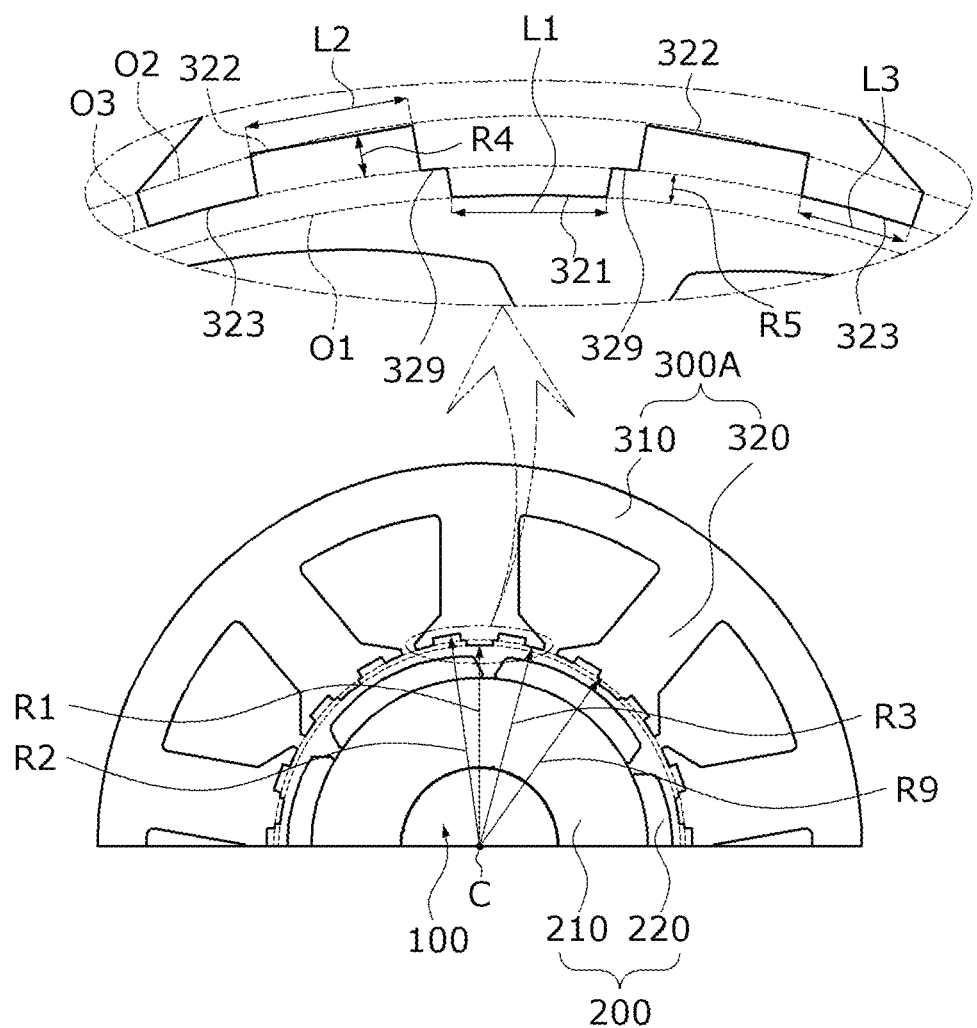

[FIG. 6]
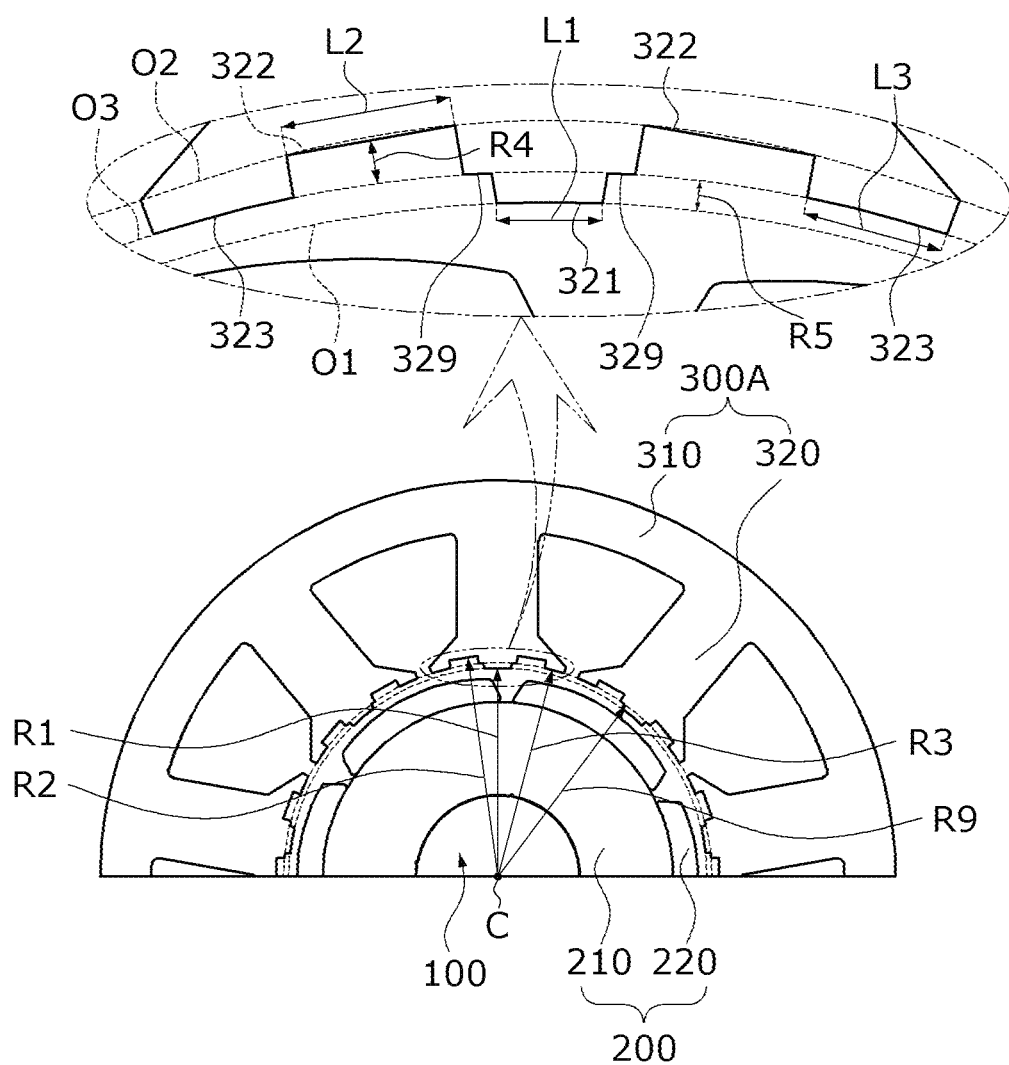

[FIG. 7]
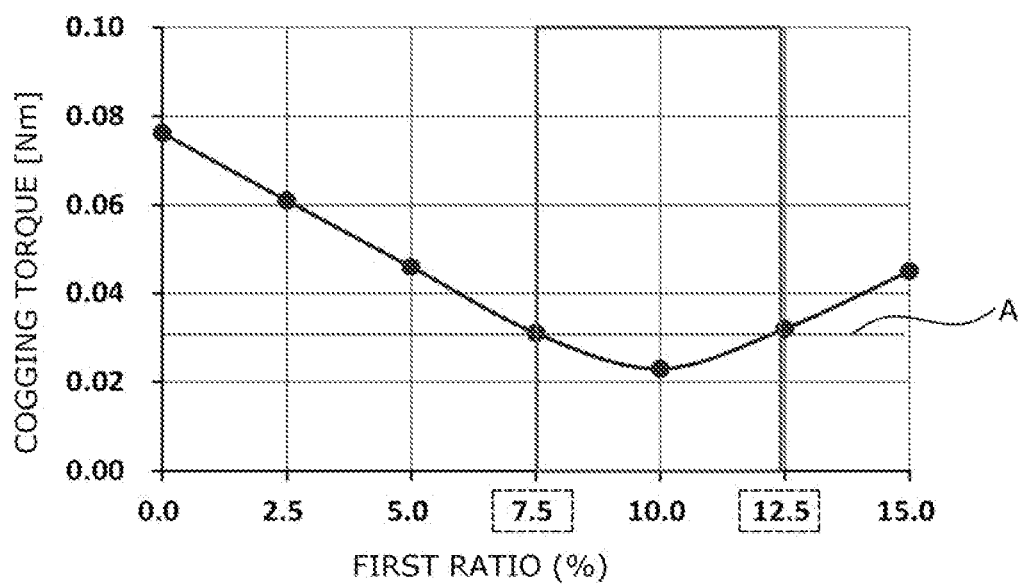

[FIG. 8]
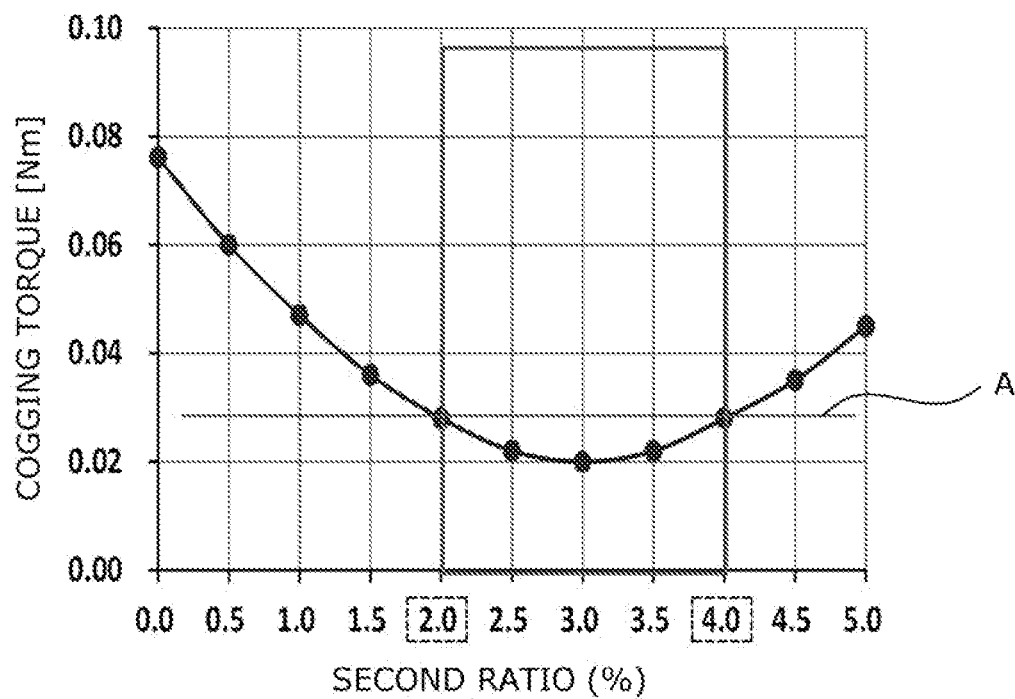

[FIG. 9]
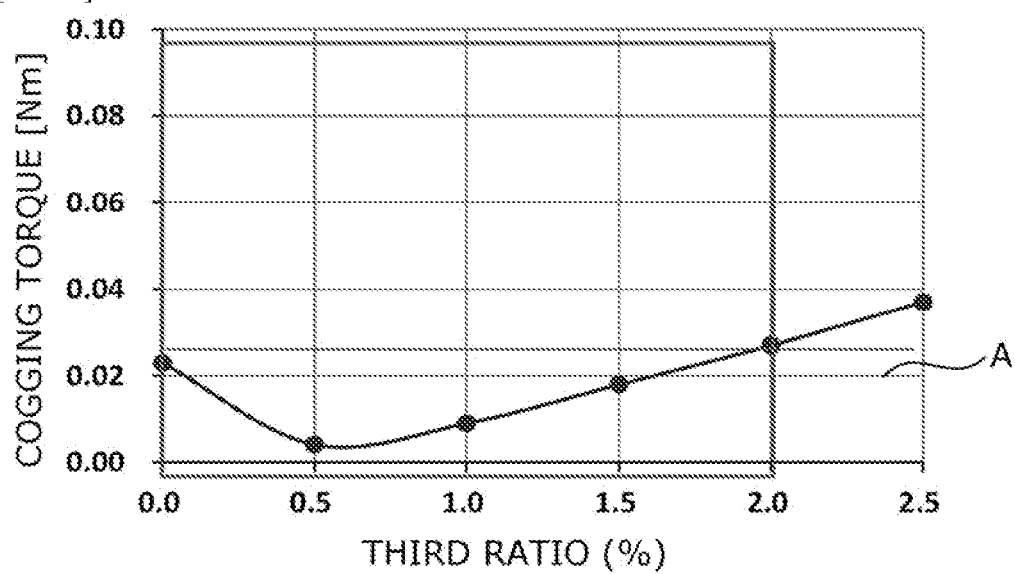

MOTOR

CROSS REFERENCE TO RELATED APPLICATIONS

This application is the National Phase of PCT International Application No. PCT/KR2020/007474, filed on Jun. 10, 2020, which claims priority under 35 U.S.C. 119 (a) to Patent Application Nos. 10-2019-0068764 and 10-2019-0102384, filed in the Republic of Korea on Jun. 11, 2019 and Aug. 21, 2019, respectively, all of which are hereby expressly incorporated by reference into the present application.

TECHNICAL FIELD

The present invention relates to a motor.

BACKGROUND ART

An electric power steering (EPS) system is an apparatus which secures turning stability of a vehicle and rapidly provides a restoring force so that a driver can drive the vehicle safely. The EPS system controls a vehicle's steering shaft to be driven by driving a motor using an electronic control unit (ECU) according to driving conditions detected by a vehicle speed sensor, a torque angle sensor, a torque sensor, and the like.

The motor includes a stator and a rotor. The stator may include teeth constituting a plurality of slots, and the rotor may include a plurality of magnets facing the teeth. The adjacent teeth are disposed to be spaced apart from each other to constitute slot opens. In this case, a cogging torque may be generated due to a difference in magnetic permeability between the stator formed of a metal material and the slot open, which is an empty space, when the rotor rotates. Since such a cogging torque is a cause of noise and vibration, reducing the cogging torque is the most important in improving quality of the motor.

DISCLOSURE

Technical Problem

The present invention is directed to providing a motor capable of reducing a cogging torque.

Objectives that have to be solved according to the embodiments are not limited to the above-described objectives, and other objectives which are not described above will be clearly understood by those skilled in the art from the following specification.

Technical Solution

One aspect of the present invention provides a motor including a shaft, a rotor coupled to the shaft, and a stator disposed to correspond to the rotor, wherein the stator includes a yoke and a tooth protruding from the yoke, the tooth includes a first surface, a plurality of second surfaces, and a plurality of third surfaces which are opposite to the rotor, the second surface is disposed between the first surface and the third surfaces to have predetermined gaps therebetween in a radial direction from the shaft, and a shortest distance from the shaft to the first surface is shorter than a shortest distance from the shaft to the third surface.

The first surface may not be disposed on a circumference on which the second surface and the third surface are disposed.

Lengths of the plurality of second surfaces in a circumferential direction may be the same.

A length of the first surface in the circumferential direction may be shorter than the length of the second surface in the circumferential direction.

The length of the first surface in the circumferential direction may be the same as a length of the third surface in the circumferential direction.

The plurality of third surfaces may be disposed at both ends of the tooth.

The first surface may be disposed on a first circumference, the plurality of second surfaces may be disposed on a second circumference, the plurality of third surfaces may be disposed on a third circumference, and a radius of the first circumference, a radius of the second circumference, and a radius of the third circumference may be different from each other.

A shortest distance from the shaft to the third surface may be shorter than a shortest distance from the shaft to the second surface.

A length of the second surface in a circumferential direction may be in the range of 7.5% to 12.5% of a shortest distance from the shaft to the third surface.

A shortest distance from the third surface to the second surface may be in the range of 2% to 4% of a shortest distance from the shaft to the third surface.

A shortest distance from the second surface to the first surface may be in the range of 2% to 6% of a shortest distance from the shaft to the third surface.

A distance from the third surface to the second surface may be less than or equal to 2% of the shortest distance from the shaft to the third surface.

Another aspect of the present invention provides a motor including a shaft, a rotor coupled to the shaft, and a stator disposed to correspond to the rotor, wherein the stator includes a yoke and a tooth protruding from the yoke, the tooth includes a first protrusion, a second protrusion, and a third protrusion which are disposed adjacent to the rotor, the first protrusion is disposed between the second protrusion and the third protrusion, each of the first protrusion, the second protrusion, and the third protrusion includes one surface opposite to the rotor, and the one surface of the first protrusion is closer to the shaft than the one surface of the second protrusion and the one surface of the third protrusion.

The first protrusion, the second protrusion, and the third protrusion may be disposed to have predetermined separation regions therebetween.

Still another aspect of the present invention provides a motor including a shaft, a rotor coupled to the shaft, and a stator disposed to correspond to the rotor, wherein the stator includes a yoke and a tooth protruding from the yoke, and the tooth includes an embossed first notch and an engraved second notch which are opposite to the rotor.

The second notch may include two engraved notches, and the first notch may be disposed between two engraved notches of the second notch.

The first notch may be disposed to overlap a line passing through a center of both ends of the tooth from the shaft.

Advantageous Effects

According to an embodiment, an advantageous effect of significantly reducing a cogging torque is provided by increasing a cogging main degree.

According to an embodiment, since a cogging torque waveform due to a protrusion disposed on a tooth and a cogging torque waveform due to a groove disposed in the tooth are offset, an advantageous effect of reducing a cogging torque is provided.

DESCRIPTION OF DRAWINGS

FIG. 1 is a view illustrating a motor according to an embodiment.

FIG. 2 is an enlarged view illustrating a stator core including a first surface, a second surface, and a third surface.

FIG. 3 is an enlarged view illustrating the stator core including a first protrusion, a second protrusion, and a third protrusion.

FIG. 4 is an enlarged view illustrating the stator core including a first notch and a second notch.

FIGS. 5 and 6 are enlarged views illustrating a stator core including a first surface, a second surface, a third surface, and a fourth surface according to a modified embodiment.

FIG. 7 is a graph showing a cogging torque corresponding to a first ratio.

FIG. 8 is a graph showing a cogging torque corresponding to a second ratio.

FIG. 9 is a graph showing a cogging torque corresponding to a third ratio.

MODES OF THE INVENTION

Hereinafter, exemplary embodiments of the present invention will be described with reference to the accompanying drawings in detail. Purposes, specific advantages, and novel features of the invention will be made clear from the exemplary embodiments and the following detailed description in connection with the accompanying drawings. In addition, in the description of the present invention, detailed descriptions of related well-known functions, which unnecessarily obscure the gist of the invention, will be omitted.

FIG. 1 is a view illustrating a motor according to an embodiment.

Referring to FIG. 1, a motor 1 according to the embodiment may include a shaft 100, a rotor 200, a stator 300, a housing 400, a busbar 500, a sensing unit 600, and a substrate 700. Hereinafter, the term "inside" is referred to as a direction from the housing 400 toward the shaft 100 which is located at a center of the motor, and the term "outside" is referred to as a direction from the shaft 100 toward the housing 400 which is opposite to the inside.

The shaft 100 may be coupled to the rotor 200. When an electromagnetic interaction occurs between the rotor 200 and the stator 300 due to a current being supplied, the rotor 200 rotates, and the shaft 100 rotates in conjunction with the rotor 200. The shaft 100 is rotatably supported by bearings 10. The shaft 100 may be connected to a vehicle's steering system, and power may be transmitted to the vehicle's steering system through the shaft 100.

The rotor 200 rotates through the electrical interaction with the stator 300. The rotor 200 may be disposed inside the stator 300. The rotor 200 may include a rotor core 210 (see FIG. 2) and magnets 220 (see FIG. 2) disposed on the rotor core 210. In this case, the rotor 200 may be a surface permanent magnet (SPM) type rotor in which the magnets 220 are disposed on an outer circumferential surface of the rotor core 210 or an inner permanent magnet (IPM) type rotor in which the magnets 220 are buried inside the rotor core 210.

The stator 300 is disposed outside the rotor 200. The stator 300 may include a stator core 300A, coils 300B, and an insulator 300C installed on the stator core 300A. The coil 300B may be wound around the insulator 300C. The insulator 300C is disposed between the coil 300B and the stator core 300A to serve to electrically insulate the stator core 300A from the coil 300B. The coil 300B induces an electrical interaction with the magnets 220 (see FIG. 2).

The busbar 500 is disposed on the stator 300. The busbar 500 includes a busbar holder (not shown) formed of an insulating material and a plurality of terminals (not shown) coupled to the busbar holder. In this case, the busbar holder is formed of an insulating material to prevent the plurality of terminals from being connected to each other. In addition, the plurality of terminals serve to connect the coils 300B wound around the stator core 300A to apply currents to the coils.

The sensing unit 600 may be coupled to the shaft 100. The sensing unit 600 includes a sensing plate (not shown) and a sensing magnet (not shown) disposed on the sensing plate. A sensor, which detects a magnetic force of the sensing magnet (not shown), may be disposed on the substrate 700. In this case, the sensor may be a Hall integrated circuit (IC) and serves to detect a magnetic flux of the sensing magnet of the sensing unit 600 coupled to the shaft 100. The sensing unit 600 and the substrate 700 serve to detect a position of the rotor 200 by detecting the magnetic flux changed according to rotation.

FIG. 2 is an enlarged view illustrating a stator core including a first surface, a second surface, and a third surface.

Referring to FIG. 2, the stator core 300A may include a yoke 310 and a tooth 320. The tooth 320 may protrude from an inner circumferential surface of the yoke 310 toward a center C of the stator 300. The tooth 320 may include a plurality of teeth 320. The number of the teeth 320 may be variously changed according to the number of magnets 220. The stator core 300A may be formed by combining a plurality of divided cores each including the yoke 310 and the teeth 320.

A cogging torque is generated in the form of a wave having an amplitude and a frequency, and a cogging main degree means a number of vibration times of a cogging torque waveform per unit rotation (one rotation) of a motor. When the cogging main degree increases, since the number of the vibration times of the cogging torque waveform also increases, the cogging torque may be significantly reduced. The cogging main degree may be determined by the number of the magnets 220 and the number of the teeth 320. When the cogging main degree increases, the cogging torque may be reduced, but since the number of the magnets 220 and the number of the teeth 320 are fixed, the cogging main degree is also fixed.

However, in the motor 1 according to the embodiment, the cogging torque may be reduced using two methods. In one method, a shape of the tooth 320 is changed (into a concave notch shape) to increase a cogging main degree so as to increase a frequency so that a magnitude of a cogging torque is reduced. In the other method, the shape of the tooth 320 is changed (into a convex notch shape) to change a phase of a cogging torque waveform in reverse so that a reversed cogging torque waveform interferes with the cogging torque waveform with the normal phase thereby decreasing a magnitude of a cogging torque.

The tooth 320 may include a first surface 321, a second surface 322, and a third surface 323. The first surface 321, the second surface 322, and the third surface 323 may be an inner circumferential surface of the tooth 320 disposed opposite to the magnet 220. The first surface 321 may be disposed between two second surfaces 322 in a circumferential direction of the stator 300. Two second surfaces 322 may be disposed between two third surfaces 323. The third surfaces 323 may be disposed at both ends of the tooth 320 in the circumferential direction of the stator 300.

The first surface 321 and the second surfaces 322 may be disposed to form gaps therebetween in a radial direction of the stator 300. In addition, the third surfaces 323 and the second surfaces 322 may be disposed to form gaps therebetween in the radial direction of the stator 300. That is, the first surface 321, the second surface 322, and the third surface 323 may be disposed to be separated from each other by predetermined distances in the radial direction of the stator 300. In other words, steps may be formed between the first surface 321 and the second surfaces 322 and between the second surfaces 322 and the third surfaces 323, and connecting portions, which connect the surfaces, may be formed therebetween. In addition, a shortest distance R1 from a center of the shaft 100 to the first surface 321 may be shorter than a shortest distance R3 to the third surface 323 therefrom. In addition, the shortest distance R3 from the center of the shaft 100 to the third surface 323 may be shorter than a shortest distance R2 to the second surface 322 therefrom.

In addition, the first surface 321, the second surfaces 322, and the third surfaces 323 may be disposed on virtual circumferences about the center of the shaft 100, and in this case, the first surface 321 may be disposed on a first circumference O1, the plurality of second surfaces 322 may be disposed on a second circumference O2 having a radius which is greater than a radius of the first circumference O1, and the plurality of third surfaces 323 may be disposed on a third circumference O3 having a radius which is smaller than that of the second circumference O2 and greater than that of the first circumference O1.

Thus, the first surface 321 may be disposed to protrude further inward than the third surface 323 in the radial direction of the stator 300. The second surface 322 may be concavely disposed further outward than the third surface 323. A shape of the tooth 320 is for decreasing a cogging torque by increasing the number of vibration times of a cogging torque waveform and realizing a reverse phase.

Meanwhile, lengths L1 of a plurality of first surfaces 321 disposed on the stator core 300A may be the same in the circumferential direction. In addition, the length L1 of the first surface 321 in the circumferential direction may be shorter than a length L2 of the second surface 322 in the circumferential direction. In addition, the length L1 of the first surface 321 in the circumferential direction may be the same as a length L3 of the third surface 323 in the circumferential direction.

FIG. 3 is an enlarged view illustrating the stator core including a first protrusion, a second protrusion, and a third protrusion.

Referring to FIG. 3, the tooth 320 may include a first protrusion 324, a second protrusion 325, and a third protrusion 326, which are opposite to the magnet 220 and the rotor 200. The first protrusion 324, the second protrusion 325, and the third protrusion 326 may be disposed to be spaced apart from each other in the circumferential direction of the stator core 300A. The first protrusion 324 may be disposed between the second protrusion 325 and the third protrusion 326 in the circumferential direction of the stator core 300A. The first protrusion 324, the second protrusion 325, and the third protrusion 326 have shapes protruding from the second surfaces 322 toward the shaft 100 in the radial direction of the stator core 300A. The first protrusion 324, the second protrusion 325, and the third protrusion 326 protrude further inward than the second circumference O2. In addition, the first protrusion 324 protrudes further inward than the third circumference O3 on which inner circumferential surfaces of the second protrusion 325 and the third protrusion 326 are disposed.

The first protrusion 324 may be disposed closer to the shaft 100 than the second protrusion 325 and the third protrusion 326.

The first protrusion 324 may include the first surface 321. In addition, each of the second protrusion 325 and the third protrusion 326 may include the third surface 323. In the circumferential direction of the stator core 300A, the second surface 322 may be disposed between the first protrusion 324 and the second protrusion 325, and the second surface 322 may also be disposed between the first protrusion 324 and the third protrusion 326.

FIG. 4 is an enlarged view illustrating the stator core including a first notch and a second notch.

Referring to FIG. 4, the tooth 320 may include a first notch 327 and a plurality of second notches 328 which are opposite to the magnets 220 of the rotor. The first notch 327 has a convexly embossed shape with respect to the third surface 323. The plurality of second notches 328 have a concavely engraved shape with respect to the third surface 323. In this case, the first notch 327 and the plurality of second notches 328 may be disposed at opposite positions with respect to the third circumference O3.

In the circumferential direction of the stator core 300A, the first notch 327 may be disposed between two second notches 328. The first notch 327 may be disposed to overlap a line passing through a center of both ends of the tooth 320 from the shaft 100. A shortest distance R6 from the outer circumferential surface of the rotor core 210 to the first notch 327 may be in the range of 23% to 24% of a radius of the rotor core 210. A shortest distance R7 from the outer circumferential surface of the rotor core 210 to the second notch 328 may be in the range of 27% to 28% of the radius of the rotor core.

FIGS. 5 and 6 are enlarged views illustrating a stator core including a first surface, a second surface, a third surface, and a fourth surface according to a modified embodiment.

Referring to FIGS. 5 and 6, positions of a first surface 321, second surfaces 322, and third surfaces 323 in a radial direction are the same as the positions of the first surface 321, the second surfaces 322, and the third surfaces 323 of the stator core 300A illustrated in FIG. 2. A stator core 300A according to the modified embodiment further includes fourth surfaces 329. In a circumferential direction of a stator 300, the fourth surfaces 329 may be disposed between the first surface 321 and the second surfaces 322. The fourth surfaces 329 may be disposed between the first surface 321 and the second surfaces 322 in the circumferential direction around a center of a shaft 100 and may be disposed to have predetermined gaps from the first surface 321 and the second surfaces 322 in the radial direction from the center of the shaft 100.

In other words, steps may be formed between the fourth surface 329 and the first surface 321 and between the fourth surface 329 and the second surface 322, and connection portions, which connect the surfaces, may be formed between the surfaces. In addition, a shortest distance R1 from the center of the shaft 100 to the first surface 321 may be shorter than a shortest distance R9 to the fourth surface 329 therefrom. In addition, the third surface 323 and the fourth surface 329 may be disposed on one third circumference O3. Accordingly, a shortest distance R3 from the center of the shaft 100 to the third surface 323 may be the same as the shortest distance R9 from the center of the shaft 100 to the fourth surface 329.

Referring to FIG. 5, when compared to the stator core 300A of FIG. 2, a length L1 of the first surface in the circumferential direction and a length L2 of the second surface in the circumferential direction are the same, and a length L3 of the third surface of the stator core 300A of FIG. 5 in the circumferential direction may be shorter than the length L3 of the stator core 300A of FIG. 2.

Referring to FIG. 6, when compared to the stator core 300A of FIG. 2, a length L2 of the second surface in the circumferential direction and a length L3 of the third surface in the circumferential direction are the same, and a length L1 of the first surface of a stator core 300A of FIG. 6 in the circumferential direction may be shorter than that of the stator core 300A of FIG. 2.

FIG. 7 is a graph showing a cogging torque corresponding to a first ratio.

Referring to FIGS. 2 and 7, a value A of FIG. 7 corresponds to a reference value of a desired cogging torque. When a first ratio is in the range of 7.5% to 12.5%, a value of a cogging torque is less than or equal to the reference value. The first ratio is a ratio of the shortest distance R3 (see FIG. 2) from the center C of the shaft 100 to the third surface 323 to the length L2 (see FIG. 2) of the second surface 322 in the circumferential direction.

In this case, the shortest distance R3 may correspond to an inner radius of the stator 300. When the first ratio is less than or equal to 7.5% or greater than or equal to 12.5%, it may be seen that the value of the cogging torque is greater than 0.03 Nm which is the reference value of the cogging torque.

FIG. 8 is a graph showing a cogging torque corresponding to a second ratio.

Referring to FIGS. 2 and 8, a value A of FIG. 8 corresponds to a reference value of a desired cogging torque. When a second ratio is in the range of 2.0% to 4.0%, a value of a cogging torque is less than or equal to the reference value. The second ratio is a ratio of the shortest distance R3 from the center C of the shaft 100 to the third surface 323 to a shortest distance R4 from the third surface 323 to the second surface 322. More precisely, the second ratio is a ratio of the shortest distance R3 from the center C of the shaft 100 to the third surface 323 to the shortest distance R4 from the third circumference O3, on which the third surface 323 is disposed, to the second surface 322. When the second ratio is less than or equal to 2.0% or greater than or equal to 4.0%, it may be seen that the value of the cogging torque is greater than 0.03 Nm which is the reference value of the cogging torque.

FIG. 9 is a graph showing a cogging torque corresponding to a third ratio.

Referring to FIGS. 2 and 9, a value A of FIG. 9 corresponds to a reference value of a desired cogging torque. A third ratio may be less than or equal to 2.0%. The third ratio is a ratio of the shortest distance R3 from the center C of the shaft 100 to the third surface 323 to a shortest distance R5 from the third surface 323 to the first surface 321. More precisely, the third ratio is a ratio of the shortest distance R3 from the center C of the shaft 100 to the third surface 323 to the shortest distance R5 from the third circumference O3, on which the third surface 323 is disposed, to the first surface 321. When the third ratio is greater than or equal to 2.0, it may be seen that the value of the cogging torque is greater than 0.03 Nm which is the reference value of the cogging torque.

As described above, the motor according to one exemplary embodiment of the present invention has been specifically described with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not for limiting the technological scope. The technological scope of the present invention is not limited by the embodiments and the accompanying drawings. The scope of the present invention should be interpreted by the appended claims and encompass all equivalents falling within the scope of the appended claims.

The invention claimed is:

1. A motor comprising:
a shaft;
a rotor coupled to the shaft; and
a stator disposed to correspond to the rotor,
wherein the stator includes a yoke and a tooth protruding from the yoke,
wherein the tooth includes grooves and a plurality of protrusions disposed on an inner surface of the tooth,
wherein the grooves are disposed radially concave on the inner surface of the tooth,
wherein the plurality of protrusions are radially convexly disposed on the inner surface of the tooth,
wherein the plurality of protrusions include a first surface and a plurality of third surfaces,
wherein the grooves include a plurality of second surfaces,
wherein the first surface is disposed between the plurality of third surfaces, and
wherein a length of a protrusion including the first surface is longer than a length of protrusions including the plurality of third surfaces in a length direction of the tooth.

2. The motor of claim 1,
wherein a second surface of the plurality of second surfaces is disposed between the first surface and the plurality of third surfaces to have predetermined gaps therebetween in a radial direction from the shaft.

3. The motor of claim 2, wherein lengths of the plurality of second surfaces in a circumferential direction are the same.

4. The motor of claim 3, wherein a length of the first surface in the circumferential direction is shorter than a length of each of the plurality of second surfaces in the circumferential direction.

5. The motor of claim 4, wherein the length of the first surface in the circumferential direction is the same as a length of each of the plurality of third surfaces in the circumferential direction.

6. The motor of claim 2, wherein the plurality of third surfaces are disposed at both ends of the tooth.

7. The motor of claim 2, wherein:
the first surface is disposed on a first circumference;
the plurality of second surfaces are disposed on a second circumference;
the plurality of third surfaces are disposed on a third circumference; and a radius of the first circumference, a radius of the second circumference, and a radius of the third circumference are different from each other.

8. The motor of claim 2, wherein a length of each of the plurality of second surfaces in a circumferential direction is in a range of 7.5% to 12.5% of a shortest distance from the shaft to the plurality of third surfaces.

9. The motor of claim 2, wherein a shortest distance from the plurality of third surfaces to the plurality of second surfaces is in a range of 2% to 4% of a shortest distance from the shaft to the plurality of third surfaces.

10. The motor of claim 2, wherein a shortest distance from the plurality of second surfaces to the first surface is in a range of 2% to 6% of a shortest distance from the shaft to the plurality of third surfaces.

11. The motor of claim 10, wherein a distance from the plurality of third surfaces to the plurality of second surfaces is less than or equal to 2% of the shortest distance from the shaft to the plurality of third surfaces.

12. The motor of claim 1, wherein the tooth further includes a plurality of fourth surfaces,
- wherein a second surface of the plurality of second surfaces is disposed between the first surface and the plurality of third surfaces to have predetermined gaps therebetween in a radial direction from the shaft,
- wherein a fourth surface of the plurality of fourth surfaces is disposed between the first surface and the second surface in a circumferential direction around the shaft and is disposed between the first surface and the plurality of third surfaces to have a predetermined gap in the radial direction from the shaft,
- wherein a shortest distance from the shaft to the first surface is shorter than a shortest distance from the shaft to the plurality of third surfaces, and
- wherein a shortest distance from a center of the shaft to the plurality of third surfaces is the same as a shortest distance from the center of the shaft to the plurality of fourth surfaces.

* * * * *